United States Patent

Bary et al.

Patent Number: 5,822,273
Date of Patent: Oct. 13, 1998

[54] SEISMIC ACQUISITION AND TRANSMISSION SYSTEM WITH FUNCTIONS DECENTRALIZATION

[75] Inventors: Renate Bary, Félix Faure; Joseph Rialan, Bigôts, both of France

[73] Assignee: Institut Francais du Petrole, Rueil-Malmaison, France

[21] Appl. No.: 839,671

[22] Filed: Apr. 15, 1997

Related U.S. Application Data

[63] Continuation of Ser. No. 450,719, May 25, 1995, abandoned.

[30] Foreign Application Priority Data

May 26, 1994 [FR] France .................................. 94 06514

[51] Int. Cl.⁶ .................................................. G01V 1/22
[52] U.S. Cl. ...................................... 367/77; 340/825.15
[58] Field of Search ................... 367/77, 80; 340/825.15

[56] References Cited

U.S. PATENT DOCUMENTS

| | | | |
|---|---|---|---|
| 4,092,629 | 5/1978 | Siems et al. | 367/77 |
| 4,787,069 | 11/1988 | Beauducel et al. | 367/21 |
| 4,815,044 | 3/1989 | Deconinck et al. | 367/77 |
| 4,885,724 | 12/1989 | Read et al. | 367/77 |
| 4,908,803 | 3/1990 | Rialan | 367/77 |
| 5,206,835 | 4/1993 | Beauducel | 367/21 |
| 5,276,655 | 1/1994 | Rialan et al. | 367/77 |

FOREIGN PATENT DOCUMENTS 0594477 10/1992 European Pat. Off. .

OTHER PUBLICATIONS

IEEE Transactions on Communication Technology, vol. 14, No. 6, Dec. 1966, New York, U.S., pp. 849–854, by G. W. Hatch et al, entitled "Communications for Large Aperture Seismic Array Project".

*Primary Examiner*—Ian J. Lobo
*Attorney, Agent, or Firm*—Antonelli, Terry, Stout & Kraus, LLP

[57] ABSTRACT

The invention comprises several groups of local units (BA) suited for the acquisition, the processing and the transmission of data collected in the field by seismic receivers, each of these groups being controlled by a local station (LS) equipped to fulfill extensive functions including collection of the seismic data of the various units, management of testing and initialization operations on radio channels and on the field equipment such as seismic receivers (R), electronics in each unit RTU, monitoring of the progress of seismic operations, and reporting on results and possible anomalies. The seismic set comprises several groups (GR) of receivers, with associated local units and a local station, which are placed under the control of a central synchronization, monitoring and control station (SCC) where all the seismic data are finally gathered. The system is applicable to large-scale seismic exploration.

22 Claims, 7 Drawing Sheets

SEISMIC ACQUISITION AND TRANSMISSION SYSTEM WITH FUNCTIONS DECENTRALIZATION

This application is a Continuation of application Ser. No. 08/450,719, filed May 25, 1995 now abandoned.

BACKGROUND OF THE INVENTION

1. Field of the Invention

The invention relates to a seismic signal acquisition and collection system with decentralization of the functions, suited for carrying out large-scale seismic exploration surveys.

2. Description of the Prior Art

Within the scope of seismic exploration operations, it is often necessary to transfer to a central station such as a recording truck a large number of signals. These signals are picked up often by a considerable number of receivers such as geophones arranged in contact with the ground above a geologic formation to be studied, in response to elastic waves emitted by a seismic source and reflected by the subsoil discontinuities.

The current tendency, in the case of seismic exploration methods referred to as 3D methods, is to distribute over a zone to be explored, on land, at sea, or in coastal zones, often over several kilometers, hundreds or even thousands of seismic receivers.

Current seismic prospecting methods comprise using local acquisition units which are sometimes distributed over several kilometers and intended each for collecting the signals received by one or several receivers, for digitizing and for storing them in a local memory prior to the transmission thereof in real or delayed time to a central station through a transmission channel such as a cable, an optical fiber, a radio channel, etc.

Different seismic data transmission systems are used to connect local acquisition units to a central station. Links can be provided by cables, radio channels, via one or several possible relays, or the cable links and the radio links can be combined as described for example in French Patents 2,599,533, 2,538,561, 2,511,772 or 2,627,652.

French Patent 2,511,772 describes a transmission system where a central station communicates directly with a first set of local acquisition units by means of a first radio channel, and indirectly with a second set of local acquisition units by means of a radio relay, this mixed lay-out allowing easy adjustment to changes in the topography or to radio link difficulties in zones where seismic exploration surveys are carried out.

French Patent 2,608,780 describes a seismic data acquisition and transmission system comprising a plurality of local seismic data acquisition units each provided with an extended memory sufficient to store the data of a complete recording session. These data are collected thereafter by moving in the field, next to each of the local units, a mass storage such as a digital optical disk. During each recording session, the means of transmission between the local units and central station are used for transmitting test data or reduced recording portions, so that an operator can monitor the progress of the successive seismic "shootings".

French Patent 2,627,652 describes a semisequential transmission system allowing groups of local seismic acquisition units to communicate simultaneously with a central station, by means of several radio transmission channels of different frequencies. In each group, the local units receive respectively different serial numbers according to their location in the field. Each one of them determines the gap between its own serial number and a serial number received by radio, which is the number assigned to the first device of its group and when its turn comes, it allocates to itself the frequency assigned to the group to which it belongs and it transmits the data it has recorded. A single order therefore allows to control the semisequential transmission of data coming from determined groups of local acquisition units the central station.

French Patent 2,696,839 describes a seismic transmission system for a set of local seismic data acquisition units distributed over an exploration zone. The local acquisition units are separated into n groups and, within them, into subgroups each having a particular frequency of communication with a concentration unit that is connected to a central station by means of a radio channel, by cable or by optical fiber. Local acquisition units in the various subgroups communicate simultaneously with the corresponding concentration units during well-defined emission windows. The latter unit gathers the signals received from the local acquisition units so as to transmit them serially to the central station. The local acquisition units are suited for delaying their own emission window as a function of the rank which has been previously assigned thereto inside their respective subgroups.

French Patent 2,692,384 filed by the applicant describes a system of data acquisition comprising a plurality of local acquisition units each suited for collecting data received by receivers and of data transfer towards a central control, recording and processing station. In order to relieve the central station of part of its tasks in the case where the volume of data to be centralized and to be processed is very high, local acquisition units are used, which are provided, apart from their management processor, with complementary computing processors programmed to process the data prior to their transmission to provide various combinations of seismic signals, data compression, quality controls performed in real time during the phase of placing of the seismic equipment (seismic receivers and electronics of the acquisition means in the local units Ai in the field), etc, immediately accessible to operators in the field.

SUMMARY OF THE INVENTION

A decentralized system according to the invention allows control of large-scale acquisition, transmission and monitoring operations by seismic equipment located in an exploration zone, comprising at least one set of seismic receivers distributed over the zone in n groups (n 1) in order to receive seismic signals in response to elastic waves transmitted in the subsoil by a seismic source, local units of acquisition, control and transmission for seismic data corresponding to signals received by the receivers of each group of receivers, each of these local units comprising computing means programmed to execute programs of seismic signal acquisition, of monitoring of the local seismic equipment and of processing of the received seismic data.

The system according to the invention comprises n local central monitoring and concentration stations each comprising a control unit including computing means programmed to perform a set of functions allocated to tasks, allowing monitoring of the execution of the programs assigned to each local unit and a concentration unit, under the control of the control unit, which comprises means for communicating with several local units by bidirectional transmission channels such as radio channels, and means for managing transmissions with the local units.

For seismic prospecting surveys having a large number of seismic equipment, with several groups of local units each under the control of a local station, a central station is preferably used for synchronizing and for controlling the different local stations.

Links between the local units and the local stations are achieved by radio channels or by cable. The links connecting the local stations to the central station are preferably radio channels.

According to an embodiment, each local station comprises a microcomputer provided with programs for managing tasks relative to the acquisition of seismic data, exchanges, configuration, control, synchronization and testing of the seismic equipment, permitting a selective execution delegation to the associated local units and to a concentration unit for managing communications with the local units.

Each concentration unit comprises for example a central processor associated with storage modules and adaptation circuits with channels for communicating with the local units.

According to an embodiment, the central station comprises a microcomputer provided with high-capacity storage modules, means of monitoring and intervention by an operator, comprising a terminal with a high-resolution screen and a high-resolution printer, a concentration unit for communicating by radio channel with the local stations, the microcomputer being provided with programs for the distribution to the local stations of tasks relative to the synchronization, the carrying out of seismic operations and of operations of monitoring of the seismic equipment, the selective transmission of the data delivered by the local units and of the programs for processing the transmitted data. It can also comprises storage means for a data base relative to operating conditions and to the planning of the seismic operations.

The invention also relates to a method for controlling large-scale operations by means of the previous seismic equipment, comprising in combination:

using local units each provided with an equipment for the acquisition of the seismic signals received by the receivers (R) of each group of receivers, with transmission means and with a microcomputer associated with programs for executing operations of acquisition relative to the seismic data received by the groups of associated receivers, of monitoring of the local seismic equipment, of processing of these signals and of selective transmission, monitoring the execution of the programs by the local units of each group, by connecting them selectively, by means of first communication channels of relatively short range, to a local station comprising a microcomputer programmed to synchronize the associated group of local units and for controlling the carrying out of a certain number of tasks permitting the execution of the programs by said local units and if the number n of groups is greater than 1, using a central station connected, by second selective communication channels distinct from the first channels, to the local stations for the synchronization and the control of the local stations, the central station comprising a microcomputer provided with programs for fulfilling operations of initialization, of general synchronization, of configuration and of monitoring of the system and of control of seismic operations, permitting a selective delegation to the various local stations for the execution of determined tasks.

The structure of the system according to the invention allows an operator, while leaving a large autonomy to each set for collecting the set of traces assigned thereto, to control the repatriation to the central station of acquisition reports, in order to check the progress of the ongoing collection operations, to correct possible failures and also to bring changes to the acquisition parameters selected for these sets.

The system according to the invention is suitable for coordinating, for example, the activity of acquisition sets with transmission modes that can be different from one set to another: transmission cable link, radio link, or a self-contained offshore seismic prospecting system involved in the coverage of a zone to be explored.

BRIEF DESCRIPTION OF THE DRAWINGS

Other features and advantages of the system according to the invention will be clear from reading the description hereafter of embodiments given by way of non limitative examples, with reference to the accompanying drawings in which.

DESCRIPTION OF THE PREFERRED EMBODIMENTS

Figure 1:
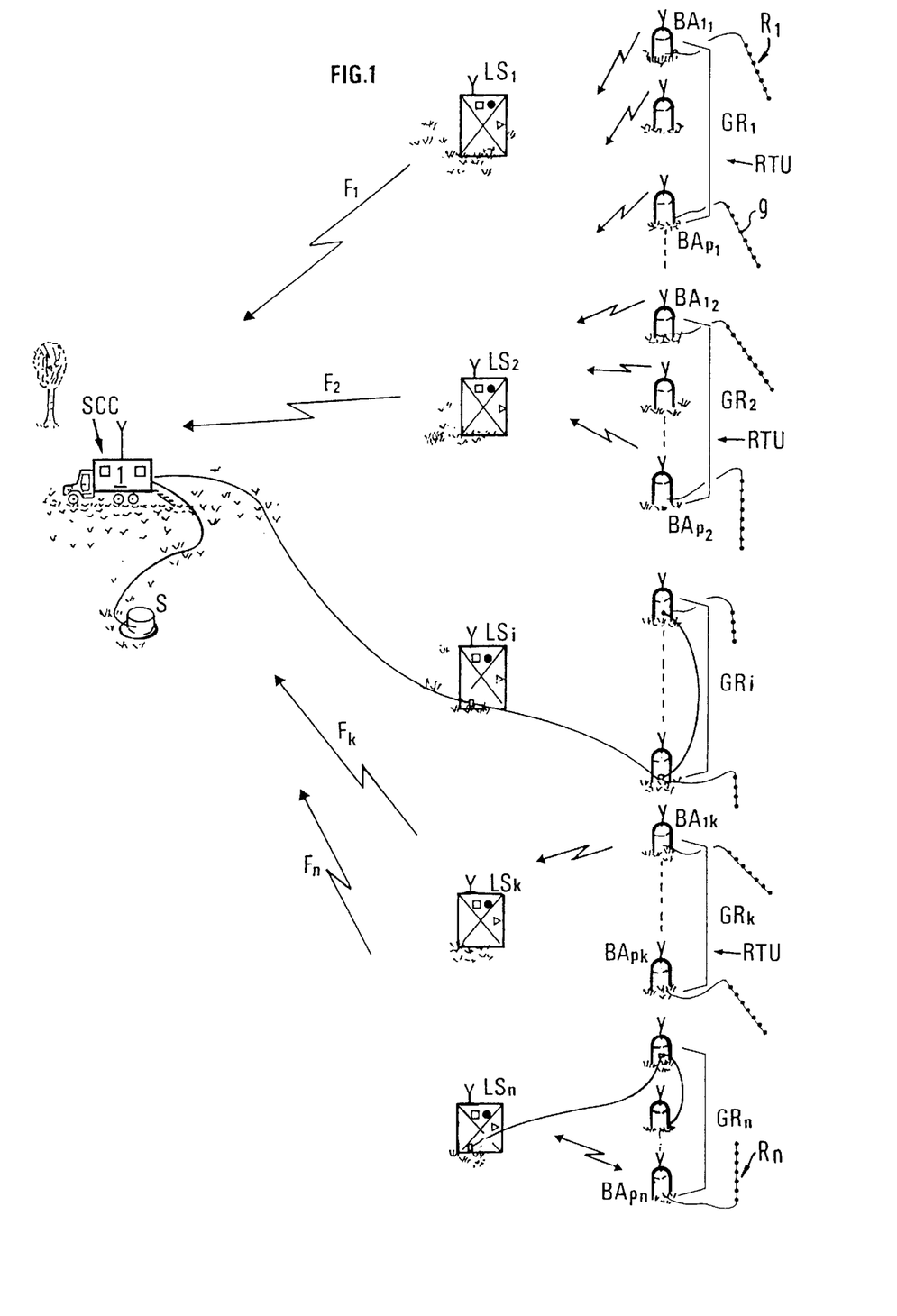
FIG. 1 diagrammatically shows the system according to the invention positioned in the field with different transmission channel possibilities between the elements.

The seismic device schematized in FIG. 1 comprises a large number of seismic receivers R (several hundreds to several thousands) distributed at intervals with respect to one another over the zone to be explored in order to pick up the seismic waves reflected by subsoil discontinuities, in response to the transmission, in the ground, of seismic waves produced by a source S, and a central control and recording station 1 where all the seismic signals collected are finally centralized by means of the transmission system described hereafter.

Each of the receivers R comprises most often a string of aligned elementary pickups g each producing a "seismic trace".

All of the receivers R in the field are subdivided into n groups GR1, GR2, . . . , GRn each comprising a certain number q of receivers R. Local acquisition and transmission units RTU bearing reference numbers BA11, . . . BAp1, . . . BApk, . . . BApn are placed in the field, each for digitizing and for storing temporarily the seismic data collected by one or several receivers R of each group. Any group GRk of order k for example comprises a certain number q of receivers connected respectively to p local acquisition units RTU bearing reference numbers BA1k, BApk for example. The numbers p and q can be different if at least part of the local units RTU (BAp2 for example in FIG. 1) is instructed to collect the seismic data coming from more than one seismic receiver R. A seismic device can thus comprise for example several hundred local units RTU.

All the units RTU of each group are under the control of a local central monitoring and concentration station LS bearing reference numbers LS1, LS2 . . . LSi, LSj . . . LSn.

Each local station LS is suited for working autonomously when the seismic operations planned only concern a certain local group of receivers R associated with their acquisition units RTU.

When the seismic operations to be performed require the use of several local groups GR, a central monitoring and synchronization station SCC, suited for communicating with the local central stations LS by a transmission channel (a radio channel HC or possibly a cable L), is installed in the exploration zone.

A seismic source S is set in the field and placed under the control, as the case may be, of a local station LS when it works autonomously, or of central station 1 within the scope of a wider operation range.

I) LOCAL ACQUISITION AND TRANSMISSION UNITS (RTU)

Figure 2:
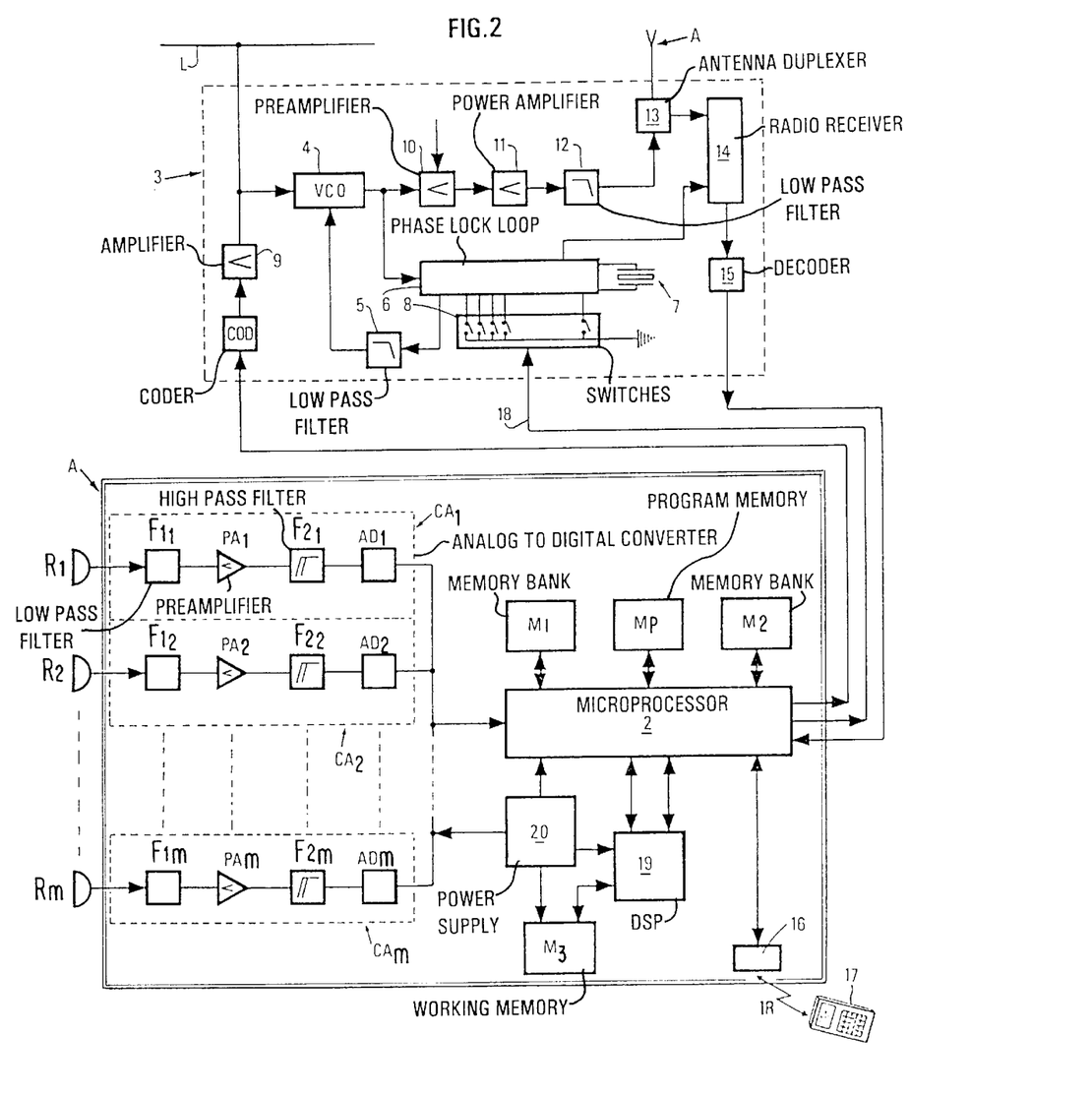
FIG. 2 diagrammatically shows a local acquisition unit RTU.

Each local unit RTU (BA1 to BApn) comprises an acquisition module A, as illustrated in FIG. 2, suited for collecting the signals received by m (one or several) different seismic receivers R.

Each module A comprises for example (FIG. 2) m acquisition chains $CA_1$ to $CA_n$ (n>1) to which the signals received by m receivers R of the group are respectively applied. Each chain comprises a low pass filter $F1_1$, $F1_2$, . . . $F_m$ of the VHF type, a pre-amplifier $PA_1$, $PA_2$, . . . $PA_m$, a high pass filter $F2_1$, $F2_2$, . . . $F2_m$ and an analog to digital converter (ADC) $AD_1$, $AD_2$, . . . , $AD_m$ for converting the amplified and filtered analog signals into digital words.

All the chains are connected to a control microprocessor 2 processing the 16-bit to 32-bit digital words for example, programmed to manage acquisition and exchanges with the central station SCC. The storage means of two memory banks M1 and M2 and a memory Mp for the programs are associated with microprocessor 2.

Microprocessor 2 is connected to a radio or line emission-reception E-R unit SRTU 3 suited to the channel used for communication with the central station 1.

Each emission-reception unit SRTU 3 comprises an oscillator 4 of the VCO type whose oscillation frequency is determined by applying a control voltage coming from a low pass filter 5. The input of filter 5 is connected to the output of a frequency synthesizing circuit 6 of a known type comprising phase lock loops (PLL) and a predivider allowing a programmable reduction factor to be applied to the reference frequency defined by a crystal 7. Selection of this reduction factor is performed by controlling selectively switches from a set of switches 8. The signal applied at the input of synthesizing circuit 6 is the signal of the VCO oscillator 4.

Switchings allowing the assigning of a particular frequency from a determined number (for example 4) of frequencies available for each group GR can be performed by an operator at the time of the setting of the local acquisition units BA in the field, or transmitted from the central station 1 by means of the local stations LS.

The signals to be transmitted, delivered by processor 2, are applied to a coding element COD of the NRZ type for example, then amplified in an amplification stage 9. They are thereafter applied on a transmission line L or at the "modulation" input of oscillator 4. The modulated carrier available at the output of oscillator 4 is applied to an amplification chain comprising a pre-amplifier 10, a power amplifier 11 and a low pass filter 12, the amplified signal being applied to an emission-reception antenna A by means of an antenna duplexer 13 of a known type.

A radio receiver 14, also connected to antenna duplexer 13, is suited for receiving the coded control signals coming from central station 1 via local unit LS, carried by a signal at a frequency common to all the local acquisition units RTU of the local group GRk. The demodulation of the received signals is performed by using a signal produced by the frequency synthesizing circuit 6. The demodulated signals coming from receiver 14 are decoded by an appropriate decoder 15, then transferred to processor 2.

Local units RTU provided with automatic switching means such as those described in French Patent 2,511,772 cited above, suited for communicating with the central station either by radio channel or by transmission lines, are for example used. With these switching means, the connection of a transmission cable L has the effect of deactivating automatically the emission and reception radio means included in unit RTU, and the central station SCC (1) is so laid-out that it switches automatically over to the adequate communication channel for communicating with any acquisition unit RTU, whatever the connection mode thereof.

Processor 2 comprises an input port 16 for the connection of an interface element 17 suited to the link type. An infrared optical receiver such as that described in French Patent 2,602,875 can for example be used, which allows an operator to communicate instructions to the acquisition device without having to establish a material link therewith.

A connection 18 is established between processor 2 and the set of switches 8, so that the reduction factor applied thereby, and therefore the emission frequency, can be changed at will.

The local acquisition and transmission units RTU (BA1 to Bpn) are placed for example in watertight housings or buoys allowing them to be used in damp zones (lakes, bogs, forests, etc).

Each acquisition module Ai preferably comprises a processor 19 specialized in certain computations. It can be for example a floating point 32-bit processor of the DSP 96002 type manufactured by Motorola, which is associated with a DMA type device for accelerating data block transfers between the two processors 2 and 19. A working memory M3 is added to processor 19. Each acquisition device also comprises a self-contained power supply unit 20.

Processor 2 functions as the master. Its function is to decode the orders transmitted by the associated local station LS and to manage:

the acquisition of the signals of receivers $R_l$ to $R_n$ by the different acquisition chains, the transmissions in connection with the emission-reception unit SRTU 3, memories $M_1$ and $M_2$ for the temporary storage of the data, the inputs/outputs, interruptions between programs, and the exchanges with computing processor DSP 19, etc.

It is also programmed, when the number of radio transmission frequencies assigned to each group is less than the total number of local units RTU, to carry out the computations necessary for the positioning of each emission window as a function of the serial number, of the frequency assigned, and of the rank fixed to the device in its subgroup, as stated above. The data necessary for these positioning computations can be fed into each device at the time of its setting in the field for example, by means of box 17 (FIG. 2) or they can be transmitted from the associated local station LS, prior to the beginning of the planned seismic recording operation.

This transmission of the computation data can in this case be performed via the local stations LS1 to LSn (FIG. 1). Programming notably relates to all the operations necessary to the assignment of a transmission frequency and to the relative positioning of the emission windows from the serial number of the acquisition device BA in the field alone, which is entered at the time of the setting thereof.

A computing processor of the DSP type has the advantage of having two different states, an active state and a wait state characterized by an extremely low power consumption that is nearly zero. When the execution of the processings ordered by processor 2 is completed and when processor 19 is set back to the wait state by the latter, it is suited for saving automatically the computation, which spares resets on each reactivation and therefore any wasting of time.

Owing to its specific structure, processor DSP 19 is particularly suited for performing at high speed operations such as format conversions, multiplications of complex numbers, Fourier transforms of the FFT type, correlations between the received signals and the emitted signals, digital filterings, stackings of successive shootings with elimination of disturbance noise of non seismic nature, combinations of the signals delivered by multi-axis seismic receivers such as triaxial geophones for example, etc. Processor 19 can also implement data compression algorithms so as to reduce the volume of data to be transmitted and thus to reduce either the transmission time or the radio bandwidth necessary, etc.

Preprocessings performed locally prior to transmission contribute to reducing substantially the number of tasks assigned to the associated local station LS and therefore the computing power that would otherwise be necessary therein when the number of seismic traces to be acquired in real time amounts to several hundred.

This layout with two processors 2 and 19 makes it possible, without affecting the normal course of the management operations by management processor 2, to carry out in real time many operations prior to the transmission of the data to the central station 1. The alternate use of the two memory banks M1 and M2 allows for example the transmission of data collected during an emission-reception cycle and preprocessed during the collection of the seismic signals of the next cycle.

Computing processors of the DSP type being very fast, their activity time during each acquisition cycle is relatively reduced. Their power consumption remains consequently very low on average, which is compatible with their use in acquisition boxes provided with a self-contained power supply.

A memory Mp of the alterable flash permanent memory type can be advantageously used, so as to remote control possibly from the local monitoring unit LS or from control box 17 a change in certain instruction sets, which allows changing certain functionalities of the local acquisition units and notably to control the carrying out of preprocessings by computing processor 7.

The remote loading of specific programs can notably allow the execution, by each acquisition device, of prior tests on the receivers R and the electronic acquisition chains.

Testing operations or qualifications of the field equipment (receivers and/or local acquisition units) are for example carried out as described in French patent FR-2,692,384 cited above.

II) LOCAL MONITORING AND CONCENTRATION STATIONS LS

II-A DESCRIPTION

The local monitoring and concentration stations LCS bearing reference numbers LS1, . . . LSk, . . . LSn (FIG. 1) are suited for checking and for synchronizing respectively the acquisition of seismic signals by the units RTU of their respective groups GR1, . . . GRk, . . . GRn, and also for concentrating locally all the collected signals. They communicate with the central station 1 by radio channel preferably, or by means of a transmission cable.

Each local station LS includes (FIG. 3), gathered in the same place, a control unit CUP and a concentration unit DCu assigned to managing communications of each local station LS with the local acquisition units RTU, either by a radio channel, or possibly by a line (twisted pair).

Figure 3:
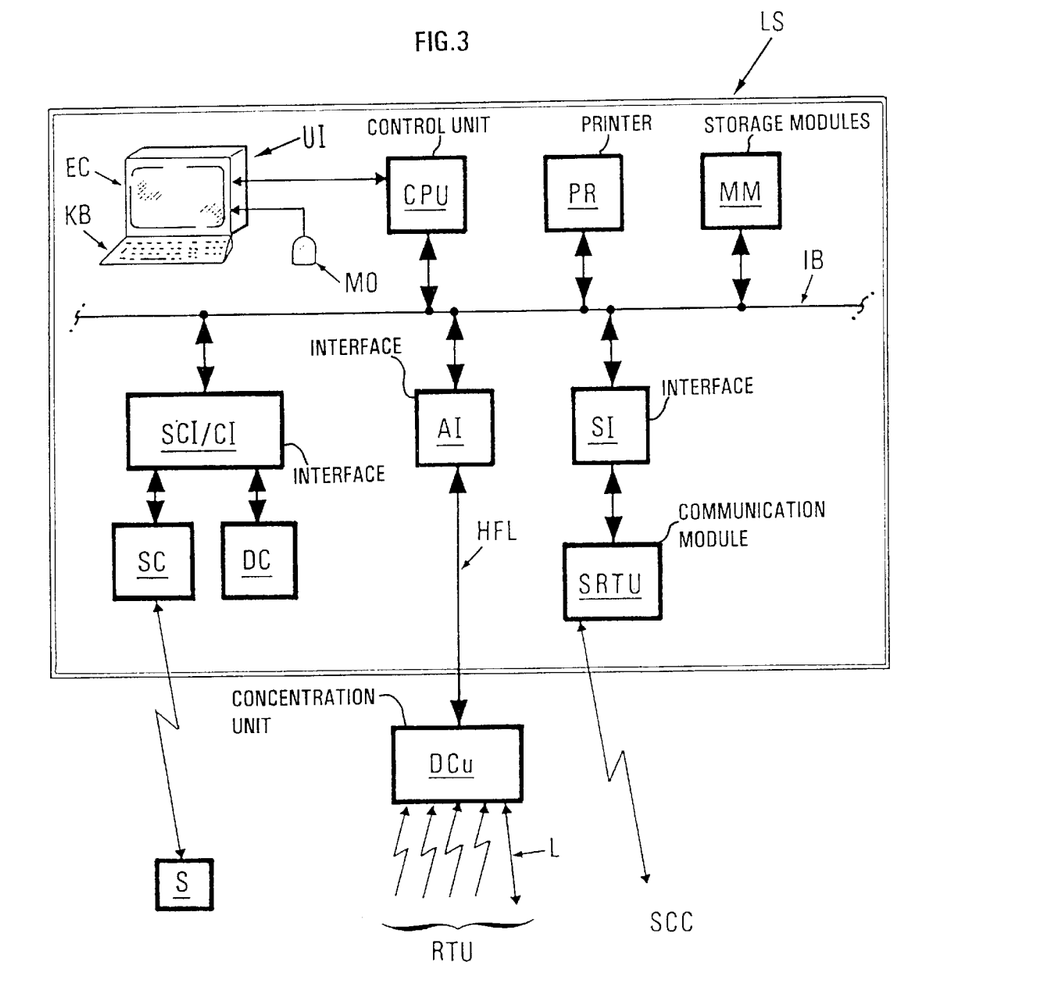
FIG. 3 diagrammatically shows a local concentration station LS.

A high-rate serial transmission channel HFL (between 40 and 125 MBaud) of the coaxial or optical fiber type connects the interface module AI to the concentration unit DCu.

Each control unit comprises a control module CPU communicating by means of a bus IB with storage modules MM (random access memories with DMA and mass storages such as a disk) and interface modules SCI/CI, AI and SI.

The interface module SCI/CI allows connection to bus IB a seismic source control module when the seismic operations to be carried out only concern a determined local group GRi and the associated local station LSi. This interface module SCI/CI also allows connection of a printer for printing the collected seismic traces on a paper storage medium.

The interface module AI is interposed between bus IB and the fast line HFL for connection with the associated concentration unit DCu. It is used as a buffer memory for the data coming from line HFL, prior to their transfer into storage modules MM.

Control module CPU is a microcomputer with a motherboard equipped with a 486 type processor for example, provided with a random access memory of sufficient capacity (16 Mbytes, much more if need be) and with a mass storage wich can reach several gigabytes. A user terminal VI comprising a screen EC, a keyboard KB and a mouse MO allows communication with an operator. Each local station LS also comprises a printer PR for the printing of operation reports and also for obtaining hard copies.

In the case where a central station SCC is installed for synchronizing several local stations LS, each one of them comprises a communication module SRTU for communicating therewith by radio channel (or possibly by means of a transmission cable). Module SRTU is for example identical to that used in the local acquisition units RTU. As described hereafter, this communication channel allows each local station to receive, from the central station SCC, orders and work parameters, and it transmits thereto on request control data coming from the associated local group GR. The communication module SRTU is connected to bus IB by means of the interface circuit SI.

Figure 4:
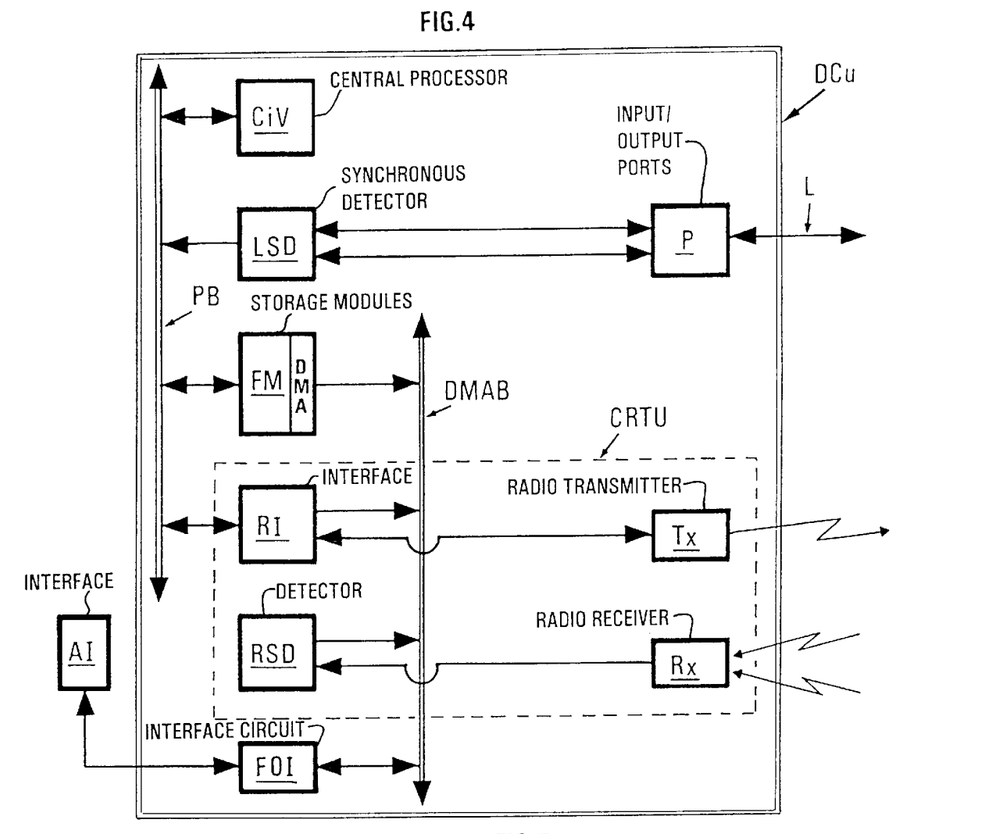
FIG. 4 diagrammatically shows a concentration module DCu inside a local station.

The function of concentration module DCu as illustrated in FIG. 4 is to relay the transmission of the commands of control module CPU towards the local stations LS and, in the opposite way, the transmission of the seismic data. Concentration module DCu comprises four electronic cards. A first card carries a central processor CiV, a second one, a synchronous line detection circuit LSD which communicates by input/output ports P. A transmission cable L can be connected to these ports P when the concentration module DCu must be connected by these means to the associated local units RTU. A third card carries storage modules FM provided with a DMA, accessible by means of an exchange bus DMAB. The fourth card FOI carries an interface circuit allowing exchanges between an exchange bus DMAB and the interface card AI (FIG. 3). The first three cards CiV, LSD and FM are also connected by an internal bus PB.

Each concentration unit DCu comprises a radio emission-reception unit CRTU suited, when this connection mode is possible, for establishing communications by radio channel with the local units RTU. This unit CRTU, as illustrated in FIG. 4, comprises:

an interface circuit RI connected to the exchange bus DMAB, to the internal bus PB and to a radio transmitter Tx emitting in the TFM mode (Tamed Frequency Mode) well-known to specialists, a synchronous radio modulation detection circuit RSD connected to a radio receiver Rx.

A certain number q of transmission frequencies fk1, fk2 ... fkq is assigned to each group GRk (FIG. 1). These frequencies are preferably specific to each group. However, when the number of frequencies available in each group GR is less than the number p of local units RTU of these groups, the local units of each group Gk are split up into q subgroups and utilization rules of these frequencies are set by assigning to each acquisition device an emission window according to a serial number and an emission frequency, as described for example in French Patent 2,692,384. In this case, processors 2 and 19 are also programmed to carry out the computations necessary to the precise positioning of each emission window in each transmission sequence.

The local central monitoring and concentration stations LS are arranged at moderate distances from the local units RTU so as to limit to about 100 mW or even less the radio emission power necessary to ensure communications. Since the regulations relative to telecommunications are not restricting for such low powers, a great number of parallel communication channels can be arranged without any difficulty between the different local units RTU and the associated local station. The number of radio channels of higher power, which require an authorization, can therefore be greatly restricted and they can be reserved for communications between the local stations LS and the central station SCC.

Communications between the local units RTU in the field and the local central stations LS, and between the latter and central station 1 can be accelerated if the data are transmitted without interposed messages. In this case, a known transmission method with interleaving and error detection is preferably selected to minimize the influence of the possible disturbances, as described in French Patent Application 91/02,243.

Figure 5:
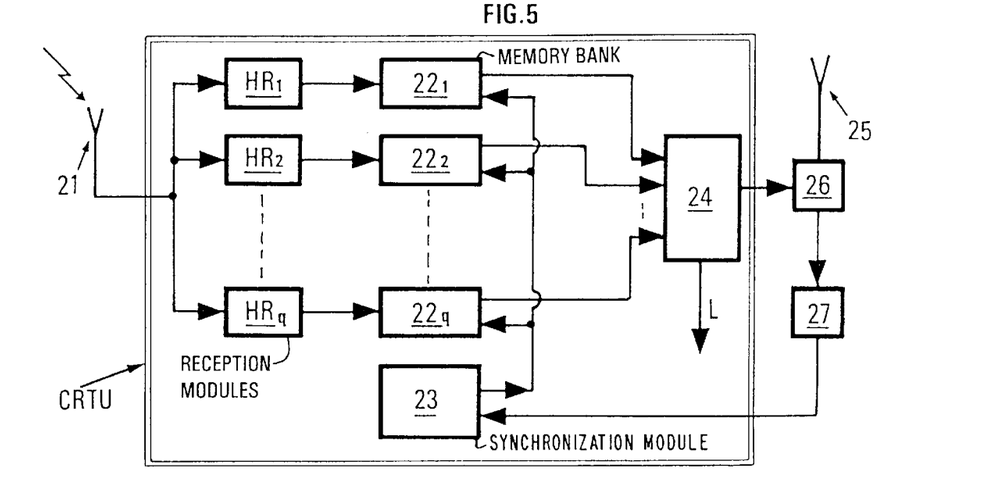
FIG. 5 shows an example of radio transmission means in the concentration module DCu.

The emission-reception set Tx, Rx of each concentration unit DCu comprises for example (FIG. 5) radio reception means including q reception modules HR1, HR2 ... HRq connected in parallel to an antenna 21 matched with the q frequencies fk1 to fkq allocated to the associated groups GRi, so as to separate signals received simultaneously from q local units RTU among the units of this group. The received signals, after separation, are placed into memory banks 221, 222 ... 22q of the FIFO type for example. These banks are controlled by a synchronization module 23 suited for managing the simultaneous entering of the received signals in the memory and their sequential read back. The reading mode selected allows to convert a set of q different signals, received simultaneously from q local acquisition units of group GRk and stored, into a stream of q successive signals that can be retransmitted on another transmission channel such as a radio channel.

II-B OPERATION

Each local central station LS controls the successive triggerings of source S, the transmission of the time break TB to the local units RTU via the local concentration units DCu, the acquisition by the different local acquisition units RTU of the signals reflected by the subsoil discontinuities and received by receivers R1 to Rn and then controls the centralization of the stored data. By order of control unit LCU in the local central station LS, each local acquisition unit RTU transfers thereto the data it has stored via the concentration unit DCU.

Programming of activities by tasks

The different activities allowing the smooth running of the processes are divided into catalogued tasks dedicated each to a specific process, which all have the form of computer-integrated programs in central station 1, in the local stations DCU and the local units RTU.

The tasks can be carried out in sequence or placed in competition through switchings. A real time scheduling program manages the start or the interrupt of the tasks by taking into account their respective priority degrees, or their restart when they have been interrupted a) for lack of all the necessary data at a moment of their execution, or b) on receiving an interrupt message coming from another task or c) consecutive to an outside event.

For defining a task, what is taken into account is its function, all the data necessary to its execution, the drivers required, all the interrupts imposed by the task and its pre-established priority degree.

The tasks can access a data base consisting of parameters entered by the operator, acquired seismic data and parameters for controlling the seismic system.

Figure 6:
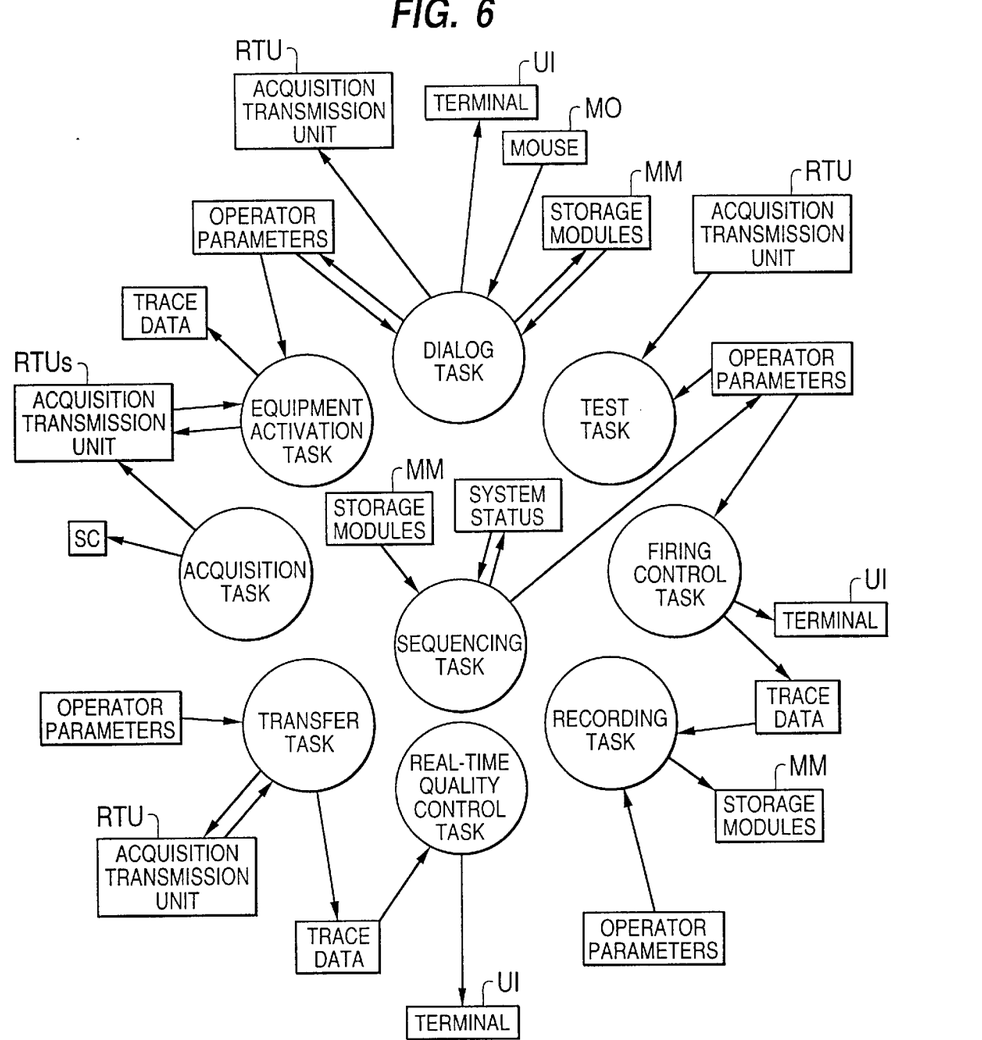
FIG. 6 shows an organization chart of the tasks carried out by the local stations LS.
Figure 7:
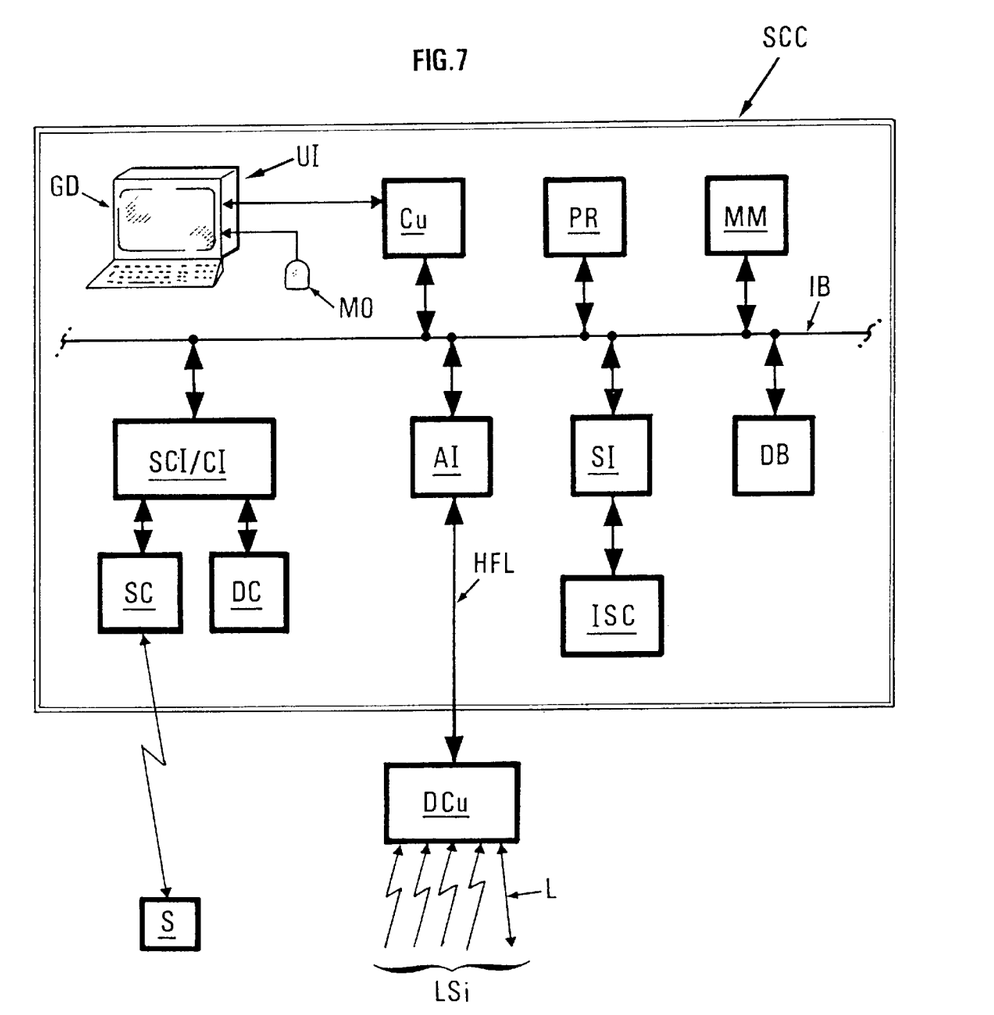
FIG. 7 diagrammatically shows the general central station SCC.
Figure 8:
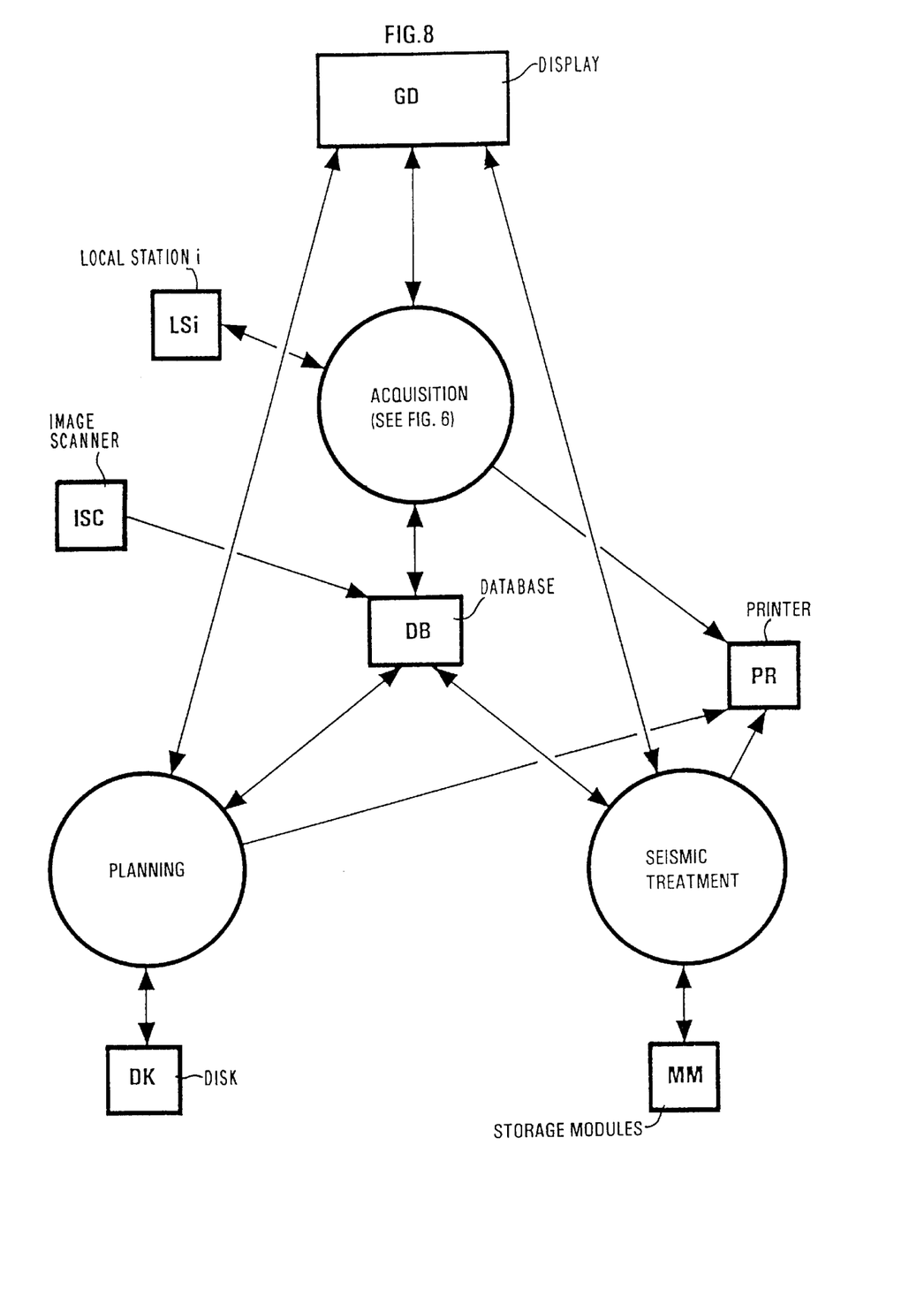
FIG. 8 shows an organization chart of the tasks carried out by this general station SCC.

The interdependence relations of the different tasks achieved by the seismic system are shown in the diagram of FIG. 6.

The main tasks executed are the following:

1) Sequencing task

This task acts as a state machine for distributing among the different tasks the operations to be performed either following the operator's initiative, or automatically as soon as the system is activated (power supply). At this time, the parameters of the data base can be updated with a set of parameters preloaded in the mass storages of the local central station (default parameters), at the end of a previous session.

2) Dialogue task

This task is used in several functions: displaying dialogue menus between the operator and the system, keeping, as requested, the parameters selected by the operator, updating the parameters specific to the local units RTU, saving in the mass storages the system parameters, as well as the parameters imposed by the operator, and restoring the context of processor CPU, i.e. its state, prior to leaving an ongoing application.

3) Field equipment activation task

The following functions are assigned to this task:

a) initialization of the local concentration unit DCu with the working parameters fixed thereto, b) initialization of the local units RTU transmitting by radio channel, c) checking the transmission cables according to a determined procedure, d) initialization of the local units RTU connected by one of the cables, e) initialization of the local acquisition units RTU which are configured for the acquisition of secondary data (signature of the seismic source for example), and f) global checking of the field equipment and display of its current state.

4) Acquisition task

The object of this task is to manage the operations for running the seismic emission-reception cycles. The functions depend on the seismic source used and on the acquisition mode and are as follows:

If the seismic source is a vibrator, the frequency scanning parameters that will be imposed on the source and the correlation mode must be transmitted to the local units;

If the operator wants each local station to perform trace stackings by means of processors 2, 7 (FIG. 2), noise standards and the combination mode have to be defined, and its execution has to be managed;

initialization of the local units RTU with the parameters imposed for the acquisition of the signals;

management of the seismic source controller involves transmitting thereto the triggering order, receiving and retransmitting to the local units RTU the time break control signal, as well as the signals confirming the effective triggering;

pacing globally the course of each emission-reception cycle, and retriggering the next cycles at determined intervals if the automatic triggering mode has been selected.

5) Collected seismic data transfer task

The object of this task is to send to each local unit RTU, by means of concentration unit DCu, the necessary order for transmitting each seismic trace stored during the cycle, according to a determined transmission protocol.

The seismic traces are received from the acquisition units RTU in the form of blocks comprising 1 to 4 traces. The transfer task must:

initialize the DMA circuits (FIG. 4) of the concentration unit DCu for each block;

send each block received towards the data base in the storage space of the central processor CPU (FIG. 3) in the local station LS during a very precise time "window", and transfer the previous block received through the fast link HFL via the interface module AI into the storage modules MM.

On each transfer, the tasks checks at least that the transferred trace has been received properly.

6) Real time quality control task

This task is in charge of the checking of the validity of the data collected during the cycle. Checking takes two main parameters into account: the noise level and the transmission errors on each trace. The parameters are displayed on the operator's screen in graphical form, which allows the defective traces to be immediately detected.

Each trace is preceded by a trace header defining the operating parameters followed by each local unit RTU for the acquisition of the signals, as well as subsidiary data such as the voltage of the power supply battery, the temperature, the results of tests relative to the electronics of the local unit RTU, etc. The header data are provided to the operator on request.

The different programs associated with each local central station LS allow many complex functions to be fulfilled automatically by division into tasks.

1) Establishing the dialogue, by means of terminal UI (FIG. 3), between the operator and the acquisition units RTU via the local concentration unit DCu, so that it can a) set the values to be given to all the parameters for the acquisition operations, for testing the field equipments, and b) globally control the progress of the seismic operations.

2) Controlling the seismic field equipment, i.e.

a) check, through pre-established test sequences, that the radio transmission channels (or lines) between the local units RTU and the local stations LS on the one hand, and those between the local stations LS and central station 1 on the other hand, work properly, and b) initialize each local unit RTU according to the set parameters and check that they work properly.

3) Acquiring the shooting data and reading them back with a view to transfers

This function allows control of the sequence of operations for performing a seismic cycle, to synchronize in each local station the exchanges between control module CPU and concentration module DCu, via interface module AI, and to organize the loading, into the memory of control module CPU, of the seismic data of each "shooting" so as to read them back correctly.

4) Controlling the quality of the seismic data

This operation, performed in each local station LS on the data received from the local units RTU, relates to the noise level of the traces (measured in a well-known manner at the end of each signal acquisition period) which allows checking of the validity of the seismic data. It also consists of detecting possible transmission errors. The results of these checks is displayed graphically on the monitor screen of terminal UI, so that the operator can easily identify defective traces or notice possible connection difficulties with the local units RTU.

5) Recording the seismic data

By this function, the operator can choose the appropriate format: S.E.G.-2, S.E.G.-D for recording on the available medium: disk, D.A.T. recorder, tape recorder, etc.

6) Testing the field equipments: strings of geophones, electronic devices in units RTU.

This test function is fulfilled by measuring the seismic noise, the electronic noise, the response of the filtering circuits, the distortion, the crosstalk between the acquisition chains CA1 to CAp (FIG. 2), the quality of the ground coupling of the strings, etc.

III) CENTRAL CONTROL STATION SCC

The central control station SCC comprises substantially the same structure and the same functional blocks as those described in connection with the local central units LS, however with the variants as follows:

the local dialogue terminal UI comprises a high-resolution screen GD;

the central unit CPU is equipped with a powerful processor of the Pentium type for example in a PC compatible environment;

the printer PR used is of a type allowing high-resolution seismic sections, mappings, etc, to be plotted;

the preferably radio link is used a) for the downloading into the local stations LS of the physical parameters and of the configuration of the field system for the planned seismic operations; and b) for the reception of the seismic acquisition control data contained in the header of each seismic trace, sent back on each "shooting" by the local stations LS. The concentration unit DCu of the central station SCC and the communication module SRTU (FIG. 3) of each local station have each a certain number q of transmission channels (4 for example). Consequently, q local stations LS communicate simultaneously with central station SCC. By way of example, 1000 trace headers are transmitted from each local station LS within 1 second.

Memory bank MM is of the removable type. It is a hard disk of very high capacity or a magnetic medium for recording seismic traces received from the local stations LS in real time during seismic operations or off-line from a magnetic medium (a disk or a tape recorded locally by a local station LS).

The central station SCC further includes:

a) a high-capacity mass storage DB for storing a data base consisting of seismic, geographic data, etc. Certain data of the data base can also be transferred into the memory bank MM, and b) an image scanner ISC connected to bus IB by means of the interface element SI. This scanner ISC is used for entering into the data base possibly a geographic map of the zone where seismic operations are performed. Such an image of the zone of operations can be used for matching up the locations of the field pickups with precise geographic data. In this case, the satellite positioning method GPS described in French Patent 2,671,197 filed by the applicant is used.

The number of communication channels necessary for exchanges between the local stations LS and the central station SCC is reduced, radio channels with higher emission powers than those of the radio channels used locally between local units BA and their respective local stations LS can be used.

Central station SCC: operation

The central station manages a certain number of control and synchronization operations:

1) It acquires and communicates to the local stations physical and operational parameters imposed by the operator when the operator the seismic system from the central station.

2) The central station is controlled by a specialized planning software of a well-known type, and also determines sets of parameters corresponding each to a precise stage of the seismic operations, which are thereafter stored in data base DB. The sets of parameters, in a preparatory stage, are transmitted selectively to each local station LS and therefrom distributed to the local acquisition units RTU. The parameters entered in the data base DB are for example: the number of active traces of the seismic exploration device set, as well as their numbers, the position of the seismic source, the definition of the successive data relative to the different shooting locations and to the points of reception of the seismic waves, the period of sampling of the seismic signals picked up, the recording time for each emission-reception cycle, etc.

3) The central station SCC checks the seismic equipment by querying each of the local stations LS after the tests have been carried out.

4) It drives the acquisition of the seismic data by sending synchronization signals to all the local stations LS on each seismic "shooting".

5) It also checks the quality of the seismic data acquired, as well as the smooth running of the connected local stations LS. Quality checking is performed from the trace headers received from each local station LS after each seismic emission-reception cycle. Part of the repatriated data concerning for example the geographic data relative to the seismic reception locations, acquired by reference to the satellite (GPS system), is used for updating data base DB. If the data analysis reveals a malfunction of an element of the seismic equipment, central station SCC can possibly readjust the seismic or operational parameters defined previously.

6) The central station is also suited for performing conventional seismic processings by means of a specialized software directly interfaced with the softwares controlling the acquisition of seismic data. Processings are applied either to seismic traces directly repatriated from the local stations as they are acquired, or off-line to seismic traces recorded on a magnetic tape or another medium in the local stations LS.

An embodiment where the central station SCC is placed at a distance from the local stations has been described. However, without departing from the scope of the invention, the central station can be installed in the same place as one of the local stations LS or a local station provided with functionalities enabling it to work also as a central station can be installed in the same place.

We claim:

1. A decentralized system for controlling acquisition, transmission, and control operations of seismic equipment installed in an exploration zone comprising:

at least one set of seismic receivers, distributed over the zone in a plurality of groups, for receiving seismic signals in response to elastic waves transmitted in subsoil from a seismic source;

a plurality of local units, each local unit including seismic equipment and a programmed control for acquisition of seismic signals received from a different group of receivers, monitoring the seismic equipment and processing seismic data corresponding to received seismic signals and a transmitter for transmitting data;

local monitoring and concentration units, each local monitoring and concentration unit being provided with means for communicating with a plurality of the plurality of local units with bidirectional transmission channels and means for managing transmissions to and from the plurality of local units; and a plurality of local central stations, each local central station including one of the local monitoring and concentration units and a control unit having a programmed control for performing a set of functions divided into tasks allowing checking of execution of programs assigned to the programmed control of each local unit and an associated local concentration unit.

2. A system in accordance with claim 1 wherein:

a number of the groups of receivers is equal to a number of local stations and local monitoring and concentration units.

3. A system as claimed in claim 1 further comprising:

at least one monitoring and control terminal for providing a dialogue with an operator, the terminal being located at the one local central station or at the another central station.

4. A system as claimed in claim 3 wherein the central station comprises:

a microcomputer provided with storage modules, means for control and intervention by an operator comprising a terminal with a screen and a printer, a concentration unit for communicating by radio channel with the local central stations, the microcomputer being provided with programs for distributing, to the local central stations, tasks relative to synchronization, to carrying-out of seismic operations and to monitoring of the seismic equipment, to the selective retrieval of data provided by the local units and to programs for processing the retrieved data.

5. A system as claimed in claim 4 further comprising:

a storage for a data base of operating conditions and planning of seismic operations.

6. A system as claimed in claim 3 comprising shorter range communication channels between the local units and the local central stations and longer range communication channels between the plurality of local central stations and the another central station.

7. A system as claimed in claim 1 further comprising:

means for monitoring the seismic source and means for synchronizing the plurality of local units.

8. A system as claimed in claim 1 wherein each concentration unit comprises:

a central processor associated with storage modules, and adaptation circuits with channels for communication with the local units.

9. A system as claimed in claim 8 comprising:

a module for monitoring the seismic source.

10. A system as claimed in claim 1, including another central station for controlling the local central stations, the another central station and the local central stations being provided with transmission modules for exchanging data with one another.

11. A decentralized system for controlling acquisition, transmission, and control operations of seismic equipment installed in an exploration zone comprising:

at least one set of seismic receivers, distributed over the zone in a plurality of groups, for receiving seismic signals in response to elastic waves transmitted in a subsoil of the exploration zone from seismic source;

a plurality of local units, each local unit including seismic equipment and a programmed control for acquisition of seismic signals from a different group of receivers of each group of receivers, monitoring the local seismic equipment and processing seismic data corresponding to received seismic signals and a transmitter for transmitting seismic data;

local monitoring and concentration units, each local monitoring and concentration unit communicating with an associated plurality of local units in the plurality of the plurality of local units with bidirectional transmission channels and managing transmissions to and from the plurality of local units; and a plurality of local central stations, each local central station including one of the local monitoring and concentration units and a control unit having a programmed control associated with a data base for storing selected parameters and seismic signals, for performing a set of functions divided into tasks allowing checking of execution of programs assigned to the programmed control of the associated plurality of local units, each task comprising computer-integrated programs in the local central station and each local unit dedicated to a specific process, and means for determining the tasks performed by the control.

12. A system as claimed in claim 11 wherein the tasks comprise sequencing operations, exchanging data with an operator, acquiring seismic data, activating equipment in the field, collecting seismic data, transferring collected seismic data and providing real time control of local seismic equipment.

13. A system in accordance with claim 12 wherein:

a number of the groups of receivers is equal to a number of local stations and local monitoring and concentration units.

14. A system in accordance with claim 11 wherein:

a number of the groups of receivers is equal to a number of local stations and local monitoring and concentration units.

15. A system as claimed in claim 11, including another central station for controlling the local central stations, the another central station and the local central stations being provided with transmission modules for exchanging data with one another.

16. A system as claimed in claim 11 further comprising:

a monitoring device monitoring the seismic source and a synchronizing device synchronizing the plurality of local units.

17. A method for controlling acquisition, transmission and control of operation of seismic equipment installed in an exploration zone, including a set of seismic receivers distributed over the zone in a plurality of groups for receiving seismic signals in response to elastic waves transmitted in a subsoil of the exploration zone from a seismic source, a plurality of local units, each local unit being provided with equipment for acquiring seismic signals received from a different group of receivers, a transmitter, a control unit having a programmed control provided with programs for executing operations of acquisition of the seismic signals received by the different group of receivers, monitoring of the equipment, processing of the seismic signals and controlling selective transmission of data comprising:

monitoring execution of the programs by the local units by connecting different subassemblies of the local units selectively, through first communication links having a shorter range, respectively to a local central station each including a local monitoring and concentration unit and a control unit having a programmed control provided with programs for synchronizing the selectively connected local units and controlling execution of tasks by the local units; and using another central station connected, through second communication links having a longer range, not coupled to the first communication links, for synchronizing and controlling of the local stations, the another central station comprising a control provided with programs for carrying out operations of initialization, synchronization, configuration and monitoring and for controlling seismic operations and selective delegation to different local units execution of tasks by the local units.

18. A method in accordance with claim 17 wherein:

a number of the groups of receivers is equal to a number of local stations and local monitoring and concentration units.

19. A decentralized system for controlling acquisition, transmission and control operations of seismic equipment installed in an exploration zone comprising:

at least one set of seismic receivers, distributed over the zone in a plurality of groups, for receiving seismic signals in response to elastic waves transmitted in the subsoil of the exploration zone from a seismic source;

a plurality of local units, each local unit including seismic equipment and a programmed control for acquisition of seismic signals from a different group of receivers of each group of receivers, monitoring the local seismic equipment and processing seismic data corresponding to the received seismic signals and transmitter for transmitting seismic data;

a plurality of local monitoring and concentration units, each local monitoring and concentration unit communicating with an associated plurality of local units in the plurality of local units with bidirectional transmission channels and managing transmissions to and from the plurality of local units; and a plurality of local central stations, each local central station including one of the local monitoring and concentration units and a control unit for performing a set of functions divided into tasks, having a programmed microcomputer provided with programs for managing tasks relative to an acquisition of seismic data, exchanges of data at least with the associated plurality of local units, configuration, monitoring, synchronization and quality control of the seismic equipment, and for selectively delegating tasks to the associated plurality of local units and to a concentration unit for managing communications with the associated plurality of local units allowing checking of execution of programs associated with the programmed control of each local unit, and an associated local concentration unit.

20. A decentralized system for controlling acquisition, transmission and control operations of seismic equipment installed in an exploration zone comprising:

at least one set of seismic receivers, distributed over the zone in a plurality of groups, for receiving seismic signals in response to elastic waves transmitted in the subsoil of the exploration zone from a seismic source;

a plurality of local units, each local unit including seismic equipment and a programmed control for acquisition of seismic signals from a different group of receivers of each group of receivers, monitoring the local seismic equipment and processing seismic data corresponding to the received seismic signals and a transmitter for transmitting seismic data;

local monitoring and concentration units, each local monitoring and concentration unit communicating with an associated plurality of local units in the plurality of local units with bidirectional transmission channels and for managing transmissions to and from the plurality of local units; and a plurality of local central stations, each local central station including one of the local monitoring and concentration units and a control unit have a programmed control for performing a set of functions divided into tasks, each defined at least by a function, data and control instructions necessary for execution thereof and interruption rules, allowing checking of execution of programs assigned to the programmed control of each local unit, and an associated local concentration unit.

21. A system as claimed in claim 20, including another central station for controlling the local central stations, the another central station and the local central stations being provided with transmission modules for exchanging data with one another.

22. A system as claimed in claim 20 further comprising:

a monitoring device monitoring the seismic source and a synchronizing device synchronizing the plurality of local units.

\* \* \* \* \*